July 7, 1942.　　　　B. G. FREUND　　　　2,288,616
DEHYDRATION APPARATUS
Filed Feb. 11, 1939　　　　2 Sheets-Sheet 1
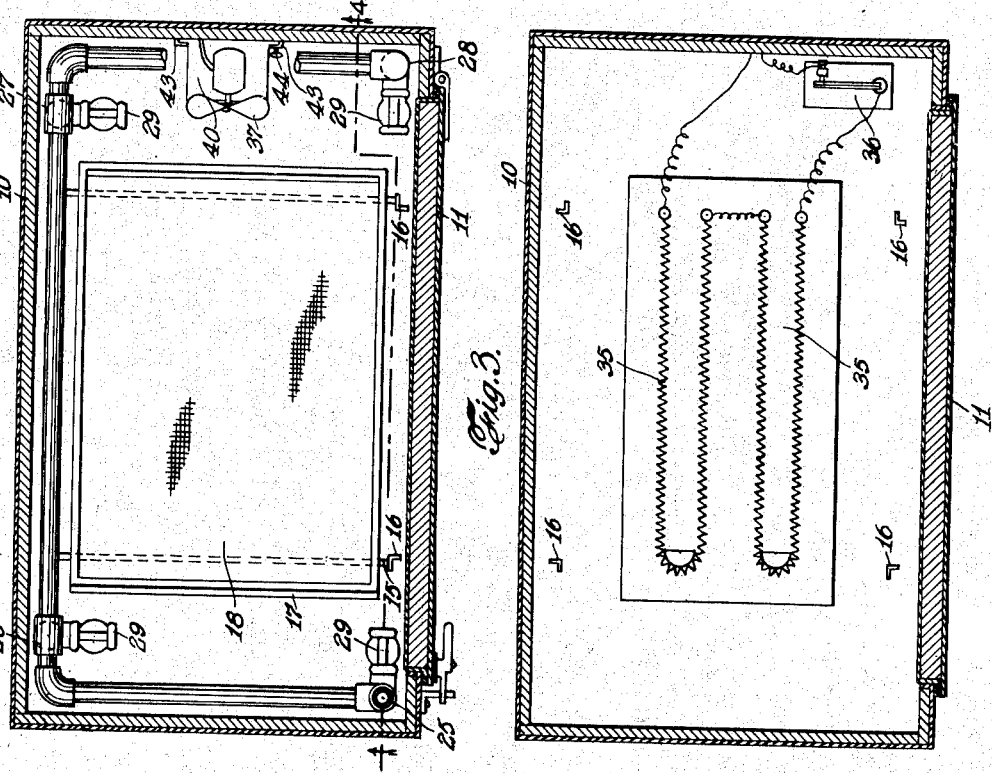
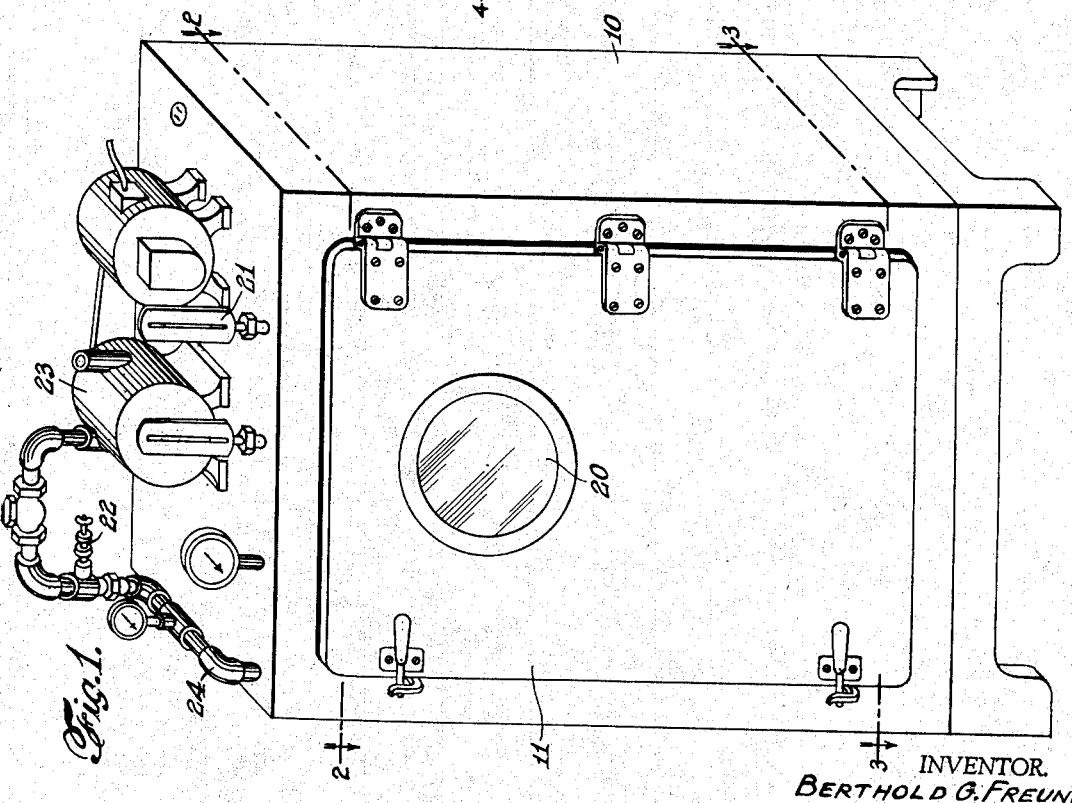
INVENTOR.
BERTHOLD G. FREUND
BY
ATTORNEY.

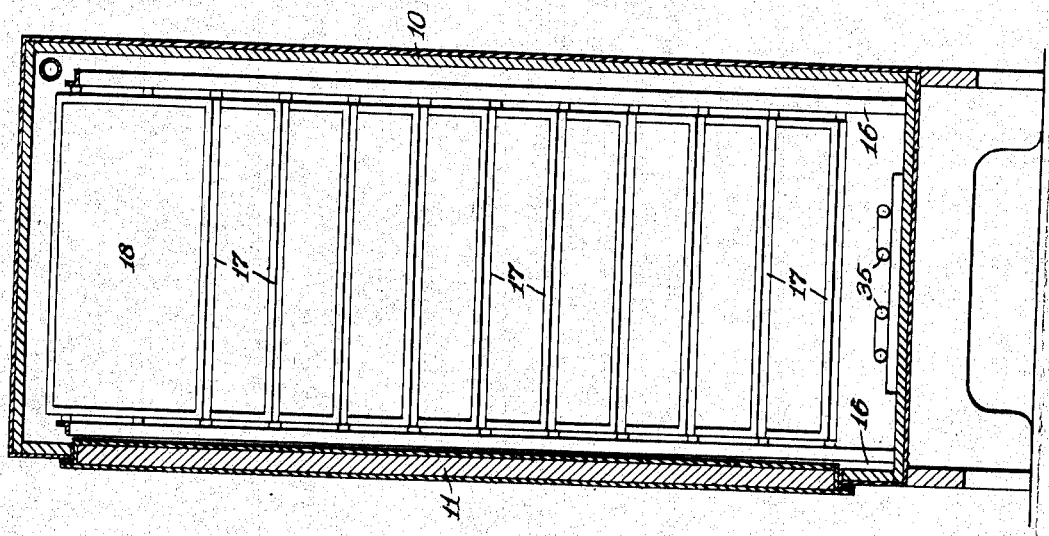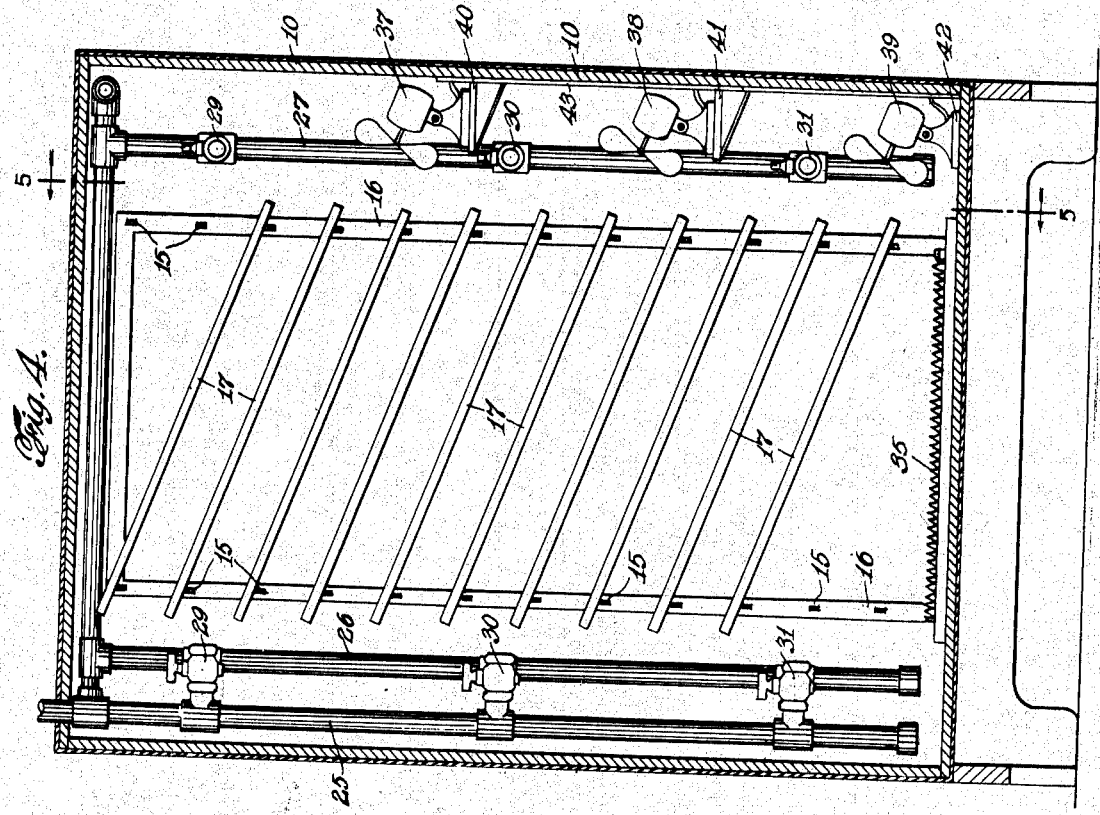

Patented July 7, 1942

2,288,616

UNITED STATES PATENT OFFICE 2,288,616

DEHYDRATION APPARATUS

Berthold G. Freund, Astoria, N. Y., assignor of one-half to Harold A. White, Wantagh, N. Y.

Application February 11, 1939, Serial No. 255,960

7 Claims. (Cl. 34—48)

The invention relates to the dehydration of foods, and more especially to a novel apparatus for providing a superior product of this nature.

The processes as heretofore practiced in the dehydration of foods generally make use of a heated atmosphere, but as a rule the temperatures employed are so high as to objectionably affect the flavor of the final product as well as the vitamin content and color. Moreover, the cost of dehydration was relatively high; and in restoring the water content in the use of the product, this required much too long a time to make the dehydrated products a serious competitor of canned food or fresh food.

The present invention has for an object a novel apparatus for treating foods whereby not only may the flavor, vitamins, mineral salts and color of the original substance be substantially preserved in the desiccated products but the same may be restored to the hydrated original state in from one-sixth to one-tenth of the time formerly required.

A further object of the invention is to provide a novel apparatus whereby it is possible to reduce materially, approximately from one-fourth to one-eighth, the time of dehydration necessary to provide a proper desiccated product. This is accomplished by removing the moisture from the fresh material at a comparatively low temperature and under conditions which will not objectionably affect the cell structure of the material.

Thus, the heating of the material is effected by circulating thereabout a large volume of a gaseous medium (air) at a temperature which is maintained not appreciably in excess of 100° F., depending upon the nature of the material, and generally at about 90° F. This heating, however, is continued only for a relatively short period and is conducted in a closed treating chamber, for example, during the period required to bring the temperature up to the aforesaid treating temperature and perhaps 10 to 15 minutes longer. This renders the cells of the material more or less flexible so that the moisture may be more rapidly removed therefrom in the subsequent step and will also prevent collapse of these cells during this subsequent treatment. Thereafter, the pressure within the treating chamber is reduced to a degree depending upon the nature of the material, ordinary food products being produced in the dehydrated condition under a vacuum of from 5-10 inches, whereas solid-containing liquids designed to be reduced to a powder condition are dehydrated under a vacuum of from 20 to 25 inches.

In maintaining this reduced pressure, the moisture evolved from the material under treatment is constantly removed from the chamber by the vacuum-producing device, but the action is not so violent as to have any appreciable destructive effect upon the cells of the material. When sufficient of the moisture thus entrained in the air has been removed, which may be determined by the physical appearance of the material under treatment, or by means of a hygrometer, the air is restored to substantially atmospheric pressure and the heating continued until the product is desiccated to the desired degree which, in the case of solids, is from 8 to 10%, and in the case of powder products, approximately 2%, moisture content.

The novel apparatus for securing these results comprises a container of suitable capacity and affording a closed heating chamber which is connected to vacuum-producing means, the connections being so arranged that gaseous medium may be withdrawn from various parts of the treating chamber and particularly at selected levels. For example, pipes may extend into the chamber and are provided with shut-off valves with intake openings to the chamber located at different levels. Suitable supporting means for trays and the like are also provided in the chamber for distributing the food to be dried therein; and a series of fans, which are adjustably mounted along one wall of the container at different levels, are arranged to circulate and direct a gaseous medium such as air over the supported material, while a controllable heating means such as an electric heater may be mounted in the bottom of the container for heating this gaseous circulating medium to the required temperature.

The nature of the invention, however, will best be understood when described in connection with the accompanying drawings, in which:

Fig. 1 shows in isometric projection a suitable container in which are embodied the features of the invention.

Fig. 2 is a horizontal section therethrough taken on the line 2—2, Fig. 1 of the drawings, and Fig. 3 is a similar view taken on the line 3—3, Fig. 1 of the drawings, looking in the direction of the arrows in both instances.

Fig. 4 is a vertical section, taken on the line 4—4, Fig. 2 of the drawings, and looking in the direction of the arrows.

Fig. 5 is a transverse vertical section through the container and taken on the line 5—5, Fig. 4 of the drawings, looking in the direction of the arrows.

Referring to the drawings, 10 designates a substantially gas-tight container whose walls are suitably insulated, and the same is provided with a door 11 for introducing and withdrawing the foods to be dehydrated and which may comprise vegetables, fruits, meats and fish, as well as solid-containing liquids, such as fruit juices, soups, milk, etc.

Within the container and extending transversely across the same is a drying rack which may be constructed of two rows of vertically disposed bars or rods 15 extending horizontally across the cabinet from a suitable frame 16 which may be removable as a whole from the cabinet for convenience in loading the same with the material to be dehydrated. This material is retained on suitable trays 17 provided with screen bottom 18, which trays are, in the case of solid foods mounted generally in an inclined position as indicated in Fig. 4 of the drawings. This is effected by supporting one end of a tray on the rod at one side of the cabinet elevated one step above that at the other side and upon which the other end of the tray is supported. Of course, in the case of the drying of liquids it will be necessary to mount the holder in a horizontal position, the same then being supported on two oppositely disposed rods at the same level.

The food material so supported in the cabinet is subjected successively to a preliminary drying operation for from 10 to 15 minutes at a temperature not appreciably in excess of 100° F. and depending somewhat on the nature of the material under treatment, the temperature generally approximating 90° F., although in some instances lower temperatures may be employed and the said preliminary drying operation being conducted at substantially atmospheric pressure. This treatment is followed by a treatment at the same temperature but under a reduced pressure of the surrounding atmosphere, whereby the moisture is more rapidly removed but without resulting in collapse of the cells of the material, which cells have been rendered more or less flexible in the previous treatment.

This reduction in pressure may be from 5 to 10 inches of mercury in the case of ordinary foods and from 20 to 25 inches in the case of solid-containing liquids designed to be reduced to a powder condition. The reduction in pressure of the gaseous medium within the container is effected by suitable vacuum-producing means hereinafter set forth and there is also removed thereby moisture evolved from the treated material. When the removal of the moisture has proceeded to the desired degree, which may be gauged by inspection of the material on the trays, as through a window or port 20 or the like provided in a wall of the container and/or by means of an hygrometer 21, the pressure is again restored to atmospheric value as by operating the safety valve 22 connected with the interior of the container. Thereupon, the material is cured to the desired degree of dehydration by continuing the treatment at elevated temperatures not exceeding appreciably 100° F., this degree of dehydration in the case of solid foods being to a moisture content of from 8 to 10% to afford the desired crispness, and in the case of solid-containing liquids dehydrated to a powder, to a moisture content of 2%. The products possess their natural color and have not suffered any appreciable loss in vitamin and mineral salt content, nor is there any substantial destruction of the cell structure so that rapid restoration to the initial state is attained when water is again added thereto. I have found that this requires approximately only from 5 to 30 minutes, as against from one to several hours for products dehydrated by processes heretofore employed. Furthermore, the entire dehydration by the novel process is completed in from one to three hours as against from six to eighteen hours.

For securing the reduction of pressure within the cabinet, vacuum-producing apparatus indicated at 23, Fig. 1 of the drawings, and preferably associated directly with the container 10, is connected through the piping 24 with the interior of the cabinet. The piping is so arranged, however, that the suction will be applied along the four corners of the cabinet, for example, through the vertically-extending pipes 25, 26, 27, and 28. Each of these pipes, furthermore, is arranged for controllable outlets at different levels, for example, in the provision of a series of valves 29, 30, and 31, whose intake openings are at the desired elevation. By this expedient, the different degrees of relative humidity of the atmosphere within the cabinet, as accumulating at different levels, may be more or less equalized and controlled in its removal, thus affording a rapid and uniform dehydration.

To secure the desired heating effect, suitable heating means are mounted at the bottom of the cabinet, for example, means such as the electric heating coil 35 may be provided and is associated with a thermostat 36 for maintaining the desired temperature of the gaseous medium within the cabinet. Provision is made, moreover, to circulate in the cabinet over the food located on the trays therein the gaseous medium, usually air, but which may be products of combustion, smoke, carbon dioxide and inert gases as conditions may require; and introduced then by operating the vacuum-producing apparatus 23 as a blower. To effect properly the circulation there is provided a plurality of electric fans 37, 38, and 39 which may be tilted to direct a current of air substantially along the axis of inclination of the different trays, the fans being mounted respectively on corresponding brackets or shelves 40, 41, and 42. These are mounted for vertical adjustment along the one side wall of the cabinet, as by being slidable in a pair of channel elements 43 and fixed in the desired position by corresponding set screws 44 clamping the same to a channel. The fans may thus be located in the most advantageous position for effecting the drying and found to be more or less opposite the intake openings of the different valves of the suction device piping.

I claim:

1. Apparatus for dehydrating food products, comprising a container affording a closed treating chamber, vacuum-producing means and a plurality of pipes communicating therewith and extending into the interior of the chamber, together with valve means affording openings to the chamber from said pipes at different levels, a plurality of supports within the chamber for receiving food to be dried, means for heating the interior of the chamber, and gaseous medium circulating means located within the chamber for circulating heated gaseous medium therein and directing the same over the food products retained on the supports.

2. Apparatus for dehydrating food products, comprising a container affording a closed treating chamber, vacuum-producing means and a plurality of pipes communicating therewith and extending into the interior of the chamber, together with a plurality of shut-off valves located along the pipes with intake opening to said chamber at different levels, a plurality of supports within the chamber for receiving food to be dried, means for heating the interior of the chamber, and gaseous medium circulating means located within the chamber for circulating heated gaseous medium therein and directing the same over the food products retained on the supports.

3. Apparatus for dehydrating food products, comprising a container affording a closed treating chamber, vacuum-producing means communicating with the chamber at different parts thereof, a plurality of supports within the chamber for receiving food to be dried, means for heating the interior of the chamber, a plurality of brackets slidably disposed for displacement vertically along a side wall of the chamber and means to secure a bracket in adjusted position, together with fans carried by the respective brackets for circulating heated gaseous medium therein and directing the same over the food products retained on the supports.

4. Apparatus for dehydrating food products, comprising a container affording a closed treating chamber, vacuum-producing means and a plurality of pipes communicating therewith and extending into the interior of the chamber, together with a plurality of shut-off valves located along the pipes, with intake openings to said chamber at different levels, a plurality of supports within the chamber for receiving food to be dried, thermostatically controlled electrical heating means mounted at the bottom of the chamber, a plurality of brackets slidably disposed for displacement vertically along a side wall of the chamber and means to secure a bracket in adjusted position, together with fans carried by the respective brackets for circulating heated gaseous medium therein and directing the same over the food products retained on the supports.

5. Apparatus for dehydrating food products, comprising a container affording a closed treating chamber, vacuum-producing means and a plurality of means communicating therewith and with the interior of the chamber at different levels between the top and the bottom of the container, and means to control the degree of vacuum, a plurality of supports within the chamber for receiving food to be dried, means for heating the interior of the chamber, and gaseous medium circulating means located within the chamber for circulating heated gaseous medium therein and directing the same over the food products retained on the supports.

6. Apparatus for dehydrating food products, comprising a container affording a closed treating chamber, vacuum-producing means and a plurality of means communicating therewith and with the interior of the chamber at different levels between the top and the bottom of the container, and means to control the degree of vacuum, together with means affording communication to the atmosphere from the interior of said container and control means included therein for controlling the communication, a plurality of supports within the chamber for receiving food to be dried, means for heating the interior of the chamber, and gaseous medium circulating means located within the chamber for circulating heated gaseous medium therein and directing the same over the food products retained on the supports.

7. Apparatus for dehydrating food products, comprising a container affording a closed treating chamber, vacuum-producing means and a plurality of means communicating therewith and with the interior of the chamber at different levels between the top and the bottom of the container, and means to control the degree of vacuum, a plurality of vertically disposed supports within the chamber for receiving food to be dried, means for heating the interior of the chamber, and a plurality of laterally disposed gaseous medium circulating means located within the chamber and adjustable vertically with respect to said supports for circulating gaseous medium within the chamber and directing the same over the food products retained on the supports.

BERTHOLD G. FREUND.